No. 635,834. Patented Oct. 31, 1899.
J. YOCOM.
FRICTION CLUTCH.
(Application filed May 6, 1898.)

(No Model.)

WITNESSES:
A. V. Groupe
H. L. Cheeseman

INVENTOR
James Yocom,
BY John R. Nolan
ATTORNEY.

UNITED STATES PATENT OFFICE.

JAMES YOCOM, OF PHILADELPHIA, PENNSYLVANIA.

FRICTION-CLUTCH.

SPECIFICATION forming part of Letters Patent No. 635,834, dated October 31, 1899.

Application filed May 6, 1898. Serial No. 679,894. (No model.)

*To all whom it may concern:*

Be it known that I, JAMES YOCOM, a citizen of the United States, residing in the city and county of Philadelphia, in the State of Pennsylvania, have invented certain new and useful Improvements in Friction-Clutches, of which the following is a full, clear, and exact description, reference being had to the accompanying drawings, forming a part of this specification.

This invention relates to friction-clutches for shafts, pulleys, and the like, and it has reference more especially to that class of clutches in which two clamping-disks are simultaneously actuated in respect to the opposing sides of an interposed member.

The invention embodies a simple, compact, and efficient construction wherein the draw-bolts are arranged in the disks at points intermediate the central member and the shaft and the lever or actuating mechanism is mounted adjacent to and connected with said bolts and disks, whereby forcible and uniform action of the disks may be effected.

The invention also comprises details of construction, which will hereinafter appear.

Figure 1:
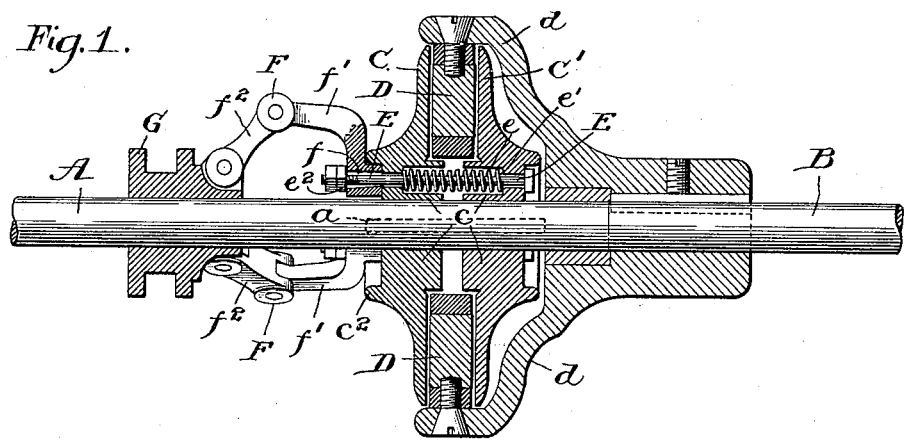
Figure 2:
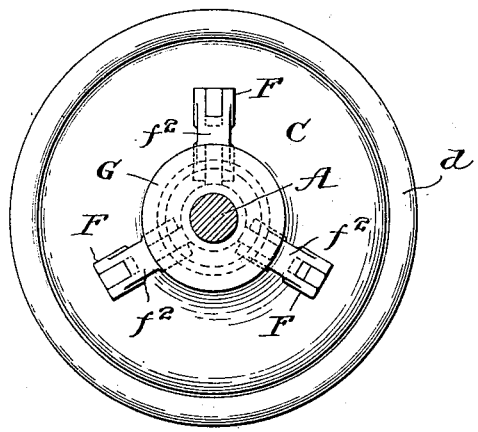
Figure 3:
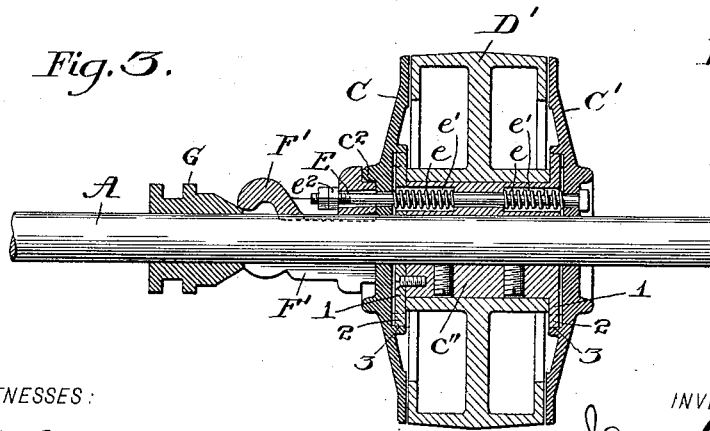
Figure 4:
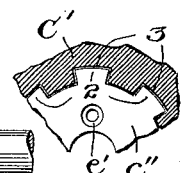

In the drawings, Figure 1 is a longitudinal vertical section through a friction "cut-off" shaft-coupling embodying my invention. Fig. 2 is an end elevation thereof. Fig. 3 is a section of a slight modification of the invention in the form of a pulley-coupling. Fig. 4 is a detail of connection between one of the disks and a central pulley-bearing sleeve.

Referring to Figs. 1 and 2, A B represent the adjoining ends of two shafts, which may be coupled together or released through the medium of my improved clutch mechanism. The shaft A is or may be a power-driven shaft. On it are mounted two disks C C', which are connected with the shaft by a spline $a$ or the like, so as to be rotatable with the shaft yet longitudinally movable thereon within limits. The disks are provided with central hubs $c$, upon or around which freely turns a friction-ring D, that is connected with the adjoining shaft by a yoke or cup $d$, fixedly keyed to the latter, whereby when the disks are clamped against the opposing sides of the ring the two shafts are rigidly coupled together. Extending through the hubs of the disks (*i. e.*, at points intermediate the central ring and the shaft) is a series of parallel draw-bolts E, encircling which are spiral springs $e$, the ends of which are contained in sockets $c'$ in the opposing ends of the hubs and act thereon in a manner to maintain the disks normally freed from the central ring. The ends of the draw-bolts are extended outwardly beyond the disk C and are fitted to slots $f$ in the inner arms $f'$ of toggle-levers F, the outer arms $f^2$ of the latter being pivoted to a grooved sliding sleeve G on the shaft A. Disk C is provided with an annular flange or projection $c^2$, against which bear the inner arms of the toggle-levers, to the end that when the sleeve is moved inward the flange or projection serves as a fulcrum for such arms, which latter, perforce, in their movement tend to push the disk C inward against the central ring and at the same time draw the bolts E outward with the effect of clamping the disk C' against said ring. Thus the two disks will be simultaneously moved with great force against the interposed ring for the purpose of coupling the two shafts together. When the sleeve is retracted, the pressure upon the disks will be released and the springs in consequence will free them from the ring.

In Fig. 3 the invention is illustrated in slightly-modified form as applied to a pulley D'. In this construction there is fixed on the shaft A a sleeve $c''$, on which the pulley is freely mounted. This sleeve is provided with end heads 1, having peripheral teeth 2, that register with corresponding sockets or recesses 3 in the disks C C', respectively, so that the disks, though rotatable with the sleeve, may be slid toward and from the opposing sides of the pulley for the purpose of clamping or releasing the latter, as desired. Extending through the sleeve and the disks are the draw-bolts E, encircling which are springs $e$, that tend to spread the disks apart—*i. e.*, disengaged from the pulley. The disk C is provided with the annular flange $c^2$, against which bear shoulders on levers F', through slots in which extend the draw-bolts. The outer or free ends of the levers extend adjacent to the slide G on the shaft and are slightly bowed to receive the tapering end of the slide when it is moved forward, whereby the levers are actuated to force the opposing disk against the pulley and at the same time draw on the bolts in a manner to clamp the opposite disk against the pulley. When the slide is retracted, the disks resume their normal position to free the pulley.

In both constructions above described it will be seen that the operations of the levers upon the disks and draw-bolts are identical, a positive and uniform bearing and drawing action upon the respective disks being effected at points adjacent to the driving-shaft. It will also be seen that owing to the described location of the draw-bolts and levers very slight adjustment of the set-nuts $e^3$ on said bolts is needed to insure the requisite uniformity of action throughout the several parts.

I claim—

1. The combination with a shaft, of a series of bolts arranged around the same and adjacent thereto, a hub or sleeve support for said bolts, mounted on the shaft, parallel plates or disks on said support, with the outer side of one of which plates or disks the said bolts are engaged, a freely-rotatable member interposed between said plates or disks and adapted to rotate upon and around said support, and lever devices mounted on said bolts and adapted to bear against the outer face of the other plate or disk, substantially as described.

2. The combination with a shaft, of a series of bolts arranged around the same and adjacent thereto, a hub or sleeve support for said bolts, mounted on the shaft, parallel plates or disks on said support, with the outer side of one of which plates or disks the said bolts are engaged, a freely-rotatable member interposed between said plates or disks and adapted to rotate upon and around said support, lever devices connected with said bolts and adapted to act against the outer face of the other plate or disk, and retracting-springs for said plates or disks mounted in the said support, substantially as described.

3. The combination, with a shaft, of two disks provided with hubs which are mounted on the shaft to be rotatable therewith but movable toward and from each other, a ring interposed between the disks and adapted to turn freely about said hubs, draw-bolts in said hubs, springs thereon, and lever mechanism for operating on one of said disks and on the draw-bolts.

In testimony whereof I have hereunto affixed my signature in the presence of two subscribing witnesses.

JAMES YOCOM.

Witnesses:
 WALTER C. PUSEY,
 JOHN R. NOLAN.